United States Patent Office 3,544,639
Patented Dec. 1, 1970

3,544,639
PRODUCTION OF ALCOHOLS
Herman S. Bloch, Skokie, Ill., assignor to Universal Oil Products Company, Des Plaines, Ill., a corporation of Delaware
No Drawing. Filed Feb. 12, 1968, Ser. No. 704,563
Int. Cl. C07c 29/00
U.S. Cl. 260—618                                     9 Claims

ABSTRACT OF THE DISCLOSURE

Alcohols, and particularly primary alcohols, are prepared by treating a mercaptan with an oxygen-containing gas in the presence of a metallic-oxidation catalyst in an aqueous alkali medium, a specific example being the preparation of butyl alcohol by treating butyl mercaptan with air in the presence of vanadium oxide.

---

This invention relates to a process for preparing alcohols, and particularly to a process for preparing primary alcohols containing a mercaptan as the starting material.

It is well known in the chemical field that alcohols comprise widely used compounds. For example, the lower fatty alcohols such as methyl alcohol, ethyl alcohol, propyl alcohol, etc., are utilized as solvents for many organic reactions or organic compounds. Other higher weight molecular alcohols such as n-octyl alcohol are used in the preparation of aroma chemicals which are formulated in perfumes, colognes, cosmetics, soaps, detergents, etc.; as an antifoaming agent, as an intermediate in the manufacture of high boiling esters, etc. Likewise, nonyl alcohol is used as an intermediate for the preparation of perfumes and flavors. Decyl alcohol is also used as a perfume intermediate, in making detergents, and esters in the preparation of lube oil additives, plasticizers, adhesives, etc. In addition, the present process is especially useful for the convesrion of primary mercaptans (which may be prepared by the reaction of alpha-olefins with hydrogen sulfide) to form primary alcohols which are useful as detergent intermediates. The detergents which result from the use of primary alcohols will be biodegradable in nature. Inasmuch as there is a rising problem concerning the appearance of foam or undissolved suds on the surface of lakes, ponds, streams, rivers, etc., which are sources for the water supply of communities such as cities, towns, villages, etc., it is imperative that any detergents or soaps must be biodegradable in nature in order that the aforementioned detergents, after their use, will be destroyed in the water and will not tend to collect and form a nuisance. Heretofore, detergents have been manufactured which are nonbiodegradable in nature due to the fact that the alkyl portion of said molecules consist of branch-chain substituents. The microorganisms which attack the molecules are not able to consume very readily the branch-chain alkyl substituents and therefore these molecules are destroyed only slowly, and tend to build up in concentration. However, in contradistinction to these types of compounds, it has been found that detergents prepared from long-chain alkyl radicals which are straight-chain in nature and do not contain any branching will be rapidly digested by the microorganisms and thus the detergent molecules will be destroyed, thereby preventing the build-up and the formation of the undesired foams or suds.

It is therefore an object of this invention to provide a process for preparing alcohols.

A further object of this invention is to provide a process for preparing alcohols which are primary in nature utilizing readily available starting materials.

In one aspect an embodiment of this invention resides in a process for the production of an alcohol which comprises treating a mercaptan with an oxygen-containing gas in the presence of a metal-containing oxidation catalyst in an aqueous alkali medium at oxidation conditions, and recovering the resultant alcohol.

A specific embodiment of this invention is found in a process for the production of an alcohol which comprises treating n-butyl mercaptan with air in the presence of an oxidation catalyst comprising vanadium oxide in an aqueous alkaline medium in a temperature range of from about 150° to about 300° C. ,and recovering the resultant n-butyl alcohol.

Other objects and embodiments will be found in the following further detailed description of the present invention.

As hereinbefore set forth, the present invention is concerned with a process for preparing alcohols, and particularly primary alcohols, by oxidizing a mercaptan with an oxygen-containing-gas in the presence of an oxidizing catalyst of the type hereinbefore set forth in greater detail, in an aqueous alkaline medium. Examples of mercaptans which may be oxidized possess the generic formula RHS in which R is selected from the group consisting of alkyl, cycloalkyl, and aralkyl radicals. Specific examples of these compounds will include alkyl mercaptans, preferably containing from 1 to about 20 carbon atoms in length such as methyl mercaptan, ethyl mercaptan, n-propyl mercaptan, n-butyl mercaptan, n-amyl mercaptan, n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-pentadecyl mercaptan, n-hexadecyl mercaptan, n-heptadecyl mercaptan, n-octadecyl mercaptan, n-nonadecyl mercaptan, n-eicosyl mercaptan, etc., and isomers thereof; cycloalkyl mercaptans such as cyclopentyl mercaptan, methylcyclopentyl mercaptan, cyclohexyl mercaptan, methylcyclohexyl mercaptan, cycloheptyl mercaptan, methylcycloheptyl mercaptan, etc.; aralkyl mercaptans such as benzyl mercaptan, beta-naphthyl ethyl mercaptan, etc.; 2-phenylethyl mercaptan, 3-phenylpropyl mercaptan, 4-phenylbutyl mercaptan, etc. It is to be understood that the aforementioned mercaptans are only representative of the class of compounds which may be used, and that the present invention is not necessarily limited thereto.

The aforementioned mercaptans are oxidized by treating said mercaptans with an oxygen-containing gas, specific examples being air or oxygen, in the presence of an oxidizing catalyst. The oxidizing catalysts which are used will include metal-containing catalysts such as vanadium oxide, cobalt oxide, copper oxide, manganese oxide, chromium oxide, etc. The reaction conditions under which the process of this invention is effected will include an elevated temperature ranging from about 100° to about 300° C., and preferably a temperature in the range of from about 150° to about 300° C. If so desired, superatmospheric pressure may also be utilized, although in the preferred embodiment of the invention the process is effected at atmospheric pressure. When utilizing temperatures in the higher range hereinbefore set forth, it may be necessary to use superatmospheric pressures in order that a major portion of the reactants will be maintained in the liquid phase. The superatmospheric pressures are supplied by introducing a substantially inert gas such as nitrogen into the reaction vessel in addition to the oxygen-containing gas. The process is also effected in an aqueous alkali medium, specific examples being a sodium hydroxide solution, a potassium hydroxide solution, a lithium hydroxide solution, etc., in which the alkali component is present in a range of from about 0.1% to about 10% of the total solution.

The process of this invention may be effected in any suitable manner and may comprise either a batch or continuous type operation. For example, when a batch type operation is used, the quantity of the mercaptan which is to be oxidized is placed in an appropriate apparatus such as, for example, the rotating autoclave along with the desired oxidation catalyst and the aqueous alkali medium in which the oxidation is to be effected. The apparatus is sealed and the oxygen-containing gas is charged thereto. As hereinbefore set forth, if superatmospheric pressures are to be employed in the reactor, the aforementioned pressure may be partially supplied by introducing an inert gas such as nitrogen to the reaction vessel. The reaction vessel and contents thereof are then heated to the desired temperature and maintained thereat for a predetermined period of time which may range from about 0.5 up to about 10 hours or more in duration. Upon completion of the desired residence time, the reactor and contents thereof are allowed to cool to room temperature. Excess pressure, if any, is vented and the reactor is opened. The organic portion of the reaction mixture is separated from the catalyst and the inorganic portion by conventional means such as filtration and decantation. Following this, the organic portion is washed, dried, and subjected to separation means of a conventional nature such as fractional distillation whereby the desired alcohol is separated from any unreacted starting material and/or side products which may have formed during the reaction.

It is also contemplated within the scope of this invention that the process may be effected in a continuous manner of operation. When such an operation is used, a reaction vessel which is maintained at the proper operating conditions of temperature and pressure, and which contains the oxidation catalyst of the type hereinbefore set forth in greater detail, has charged thereto in a continual stream a quantity of the mercaptan which is to be oxidized. In addition, the aqueous alkali medium in which the reaction is effected may be charged to the vessel through a separate line, or, if so desired, it may be admixed with the mercaptan prior to entry to the said reactor and the mixture charged thereto in a single stream. The oxidizing agent which comprises an oxygen-containing gas is also charged to the reactor and the resulting mixture is maintained in the reactor for a predetermined period of time. Upon completion of this aforementioned residence time, the reactor effluent is continuously withdrawn from the reactor and subjected to conventional means of separation whereby the unreacted starting materials are recycled to form a portion of the feed stock, while the desired alcohol is separated and recovered. Due to the particular nature of the oxidation catalyst, one method of continual operation will comprise a fixed bed type of operation in which the catalyst is disposed as a fixed bed in the reactor and the reaction mixture is passed therethrough in either an upward or downward flow. Another continuous type of operation which may be used comprises a moving bed type in which the reaction mixture and the catalyst are passed through the reactor either concurrently or countercurrently to each other. Another type of operation which may be used comprises the slurry type of operation in which the catalyst is carried into the reaction zone as a slurry in either the mercaptan or the aqueous alkali stream.

Examples of alcohols which may be prepared according to the process of this invention will include methyl alcohol, ethyl alcohol, n-propyl alcohol, isopropyl alcohol, n-butyl alcohol, t-butyl alcohol, n-amyl alcohol, isoamyl alcohol, n-hexyl alcohol, n-heptyl alcohol, n-octyl alcohol, n-nonyl alcohol, n-decyl alcohol, n-undecyl alcohol, n-dodecyl alcohol, n-tridecyl alcohol, n-tetradecyl alcohol, n-pentadecyl alcohol, n-hexadecyl alcohol, n-heptadecyl alcohol, n-octadecyl alcohol, n-nonadecyl alcohol, n-eicosyl alcohol, and isomers thereof, the normal alcohols being the preferred reaction products; benzyl alcohol, cyclopentyl alcohol, cyclohexyl alcohol, etc. It is to be understood that the aforementioned alcohols are only representative of the class of compounds which may be prepared and that the present process is not necessarily limited thereto.

While the preferred reaction products of the process of this invention comprise alcohols, it is also contemplated within the scope of this invention that other sulfur oxidation products such as the sulfates or thiosulfates may also be produced simultaneously. However, the alcohol is the reaction product of greatest interest.

The following examples are given to illustrate the process of the present invention which, however, are not intended to limit the generally broad scope of the present invention in strict accordance therewith.

EXAMPLE I

A mixture of 0.25 mole of n-butyl mercaptan, 2 grams of vanadium oxide, and 400 cc. of an aqueous 5% potassium hydroxide solution is placed in the liner of a rotating autoclave. The autoclave is sealed and air charged thereto. The autoclave and contents thereof are heated to a temperature of about 150° C. and maintained thereat for a period of about five hours. At the end of this time, the autoclave and contents thereof are allowed to cool to room temperature. The autoclave is opened and the reaction product is recovered. The alkaline mixture is extracted with pentane, the extracts are dried over potassium carbonate, and the pentane is removed by vacuum. The remaining product is subject to fractional distillation and the desired product comprising n-butyl alcohol having a boiling point of 118° C. is recovered.

EXAMPLE II

In this example, a mixture of 0.25 mole of n-octyl mercaptan, 200 cc. of a 20% aqueous potassium hydroxide solution, and 2 grams of vanadium oxide is placed in a rotating autoclave. The autoclave is sealed and air pressed in until an initial pressure of 30 atmospheres is reached. Following this, the autoclave and contents thereof are heated to a temperature of 200° C. and maintained thereat for a period of five hours. At the end of this time, the autoclave and contents thereof are allowed to cool to room temperature and the excess pressure is vented. The reaction product is recovered and the alkaline mixture is extracted with pentane. Following this, the extracts are dried and the pentanes is removed by vacuum. The remaining product is subjected to fractional distillation and the desired product comprising n-octyl alcohol is separated and recovered.

EXAMPLE III

A mixture comprising 0.25 mole of n-decyl mercaptan, 2 grams of cobalt oxide, and 200 cc. of a 20% aqueous sodium hydroxide solution is placed in a flask, provided with heating, stirring, and air inlet means. The flask is heated to a temperature of about 200° C. and the reaction mixture is constantly stirred while air is bubbled through the mixture. At the end of five hours, the introduction of air is discontinued, as is the heating. After cooling to room temperature, the reaction mixture is extracted with pentane, dried, and the solvent is removed by vacuum. Distillation of the remaining product at reduced pressure will permit recovery of the desired product comprising n-decyl alcohol.

EXAMPLE IV

In this example a mixture of 0.25 mole of n-dodecyl mercaptan, 2 grams of vanadium oxide and 200 cc. of an aqueous potassium hydroxide solution is treated in a manner similar to that set forth above. Upon completion of the desired residence time, the reaction product is recovered, the alkaline product is extracted with pentane, dried over potassium carbonate and the pentane is removed by vacuum. Fractional distillation of the remaining product under reduced pressure will permit recovery of the desired product comprising n-dodecyl alcohol.

EXAMPLE V

A mixture of 0.25 mole of benzyl mercaptan, 2 grams of vanadium oxide, and 200 cc. of an aqueous sodium hydroxide solution is placed in a rotating autoclave which is thereafter sealed and oxygen pressed in until an initial pressure of 30 atmospheres is reached. The autoclave is heated to a temperature of 200° C. and maintained thereat for the desired residence time which is five hours in duration. At the end of this time, the autoclave and contents thereof are cooled to room temperature, the excess pressure is vented and the reaction product, after recovery from the autoclave, is extracted with n-pentane as the solvent. The resultant mixture is dried and the pentane is removed by vacuum, following which the remainder of the product is subjected to fractional distillation under reduced pressure. This distillation will permit the recovery of the desired product comprising benzyl alcohol.

I claim as my invention:

1. A process for the production of an alcohol which comprises treating a mercaptan having the formula RSH, where R is alkyl, cycloalkyl or aralkyl, with a free oxygen-containing gas in the presence of an oxidation catalyst comprising an oxide of a metal selected from the group consisting of vanadium, cobalt, copper, maganese and chromium in an aqueous alkali medium at a temperature of about 150° to about 300° C., and recovering the resultant alcohol.

2. The process as set forth in claim 1 is further characterized in that said oxidation catalyst comprises vanadium oxide.

3. The process as set forth in claim 1 is further characterized in that said oxidation catalyst comprises cobalt oxide.

4. The process as set forth in claim 1 is further characterized in that said oxygen-containing gas comprises air.

5. The process as set forth in claim 1 is further characterized in that said mercaptan comprises n-butyl mercaptan and said alcohol comprises n-butyl alcohol.

6. The process as set forth in claim 1 is further characterized in that said mercaptan comprises n-octyl mercaptan and said alcohol comprises n-octyl alcohol.

7. The process as set forth in claim 1 is further characterized in that said mercaptan comprises n-decyl mercaptan and said alcohol comprises n-decyl alcohol.

8. The process as set forth in claim 1 is further characterized in that said mercaptan comprises n-dodecyl mercaptan and said alcohol comprises n-dodecyl alcohol.

9. The process as set forth in claim 1 is further characterized in that said mercaptan comprises benzyl mercaptan and said alcohol comprises benzyl alcohol.

References Cited

UNITED STATES PATENTS 3,418,382  12/1968  Dombro _____ 260—632

OTHER REFERENCES

Remy, Treatise On Inorganic Chemistry (1956), pp. 92–93.

Reid, Organic Chemistry of Bivalent Sulfur (1958), pp. 118–119.

BERNARD HELFIN, Primary Examiner

U.S. Cl. X.R.

260—632, 617, 631